Sept. 2, 1941.  W. F. ALLER  2,254,812
GAUGING APPARATUS
Filed Nov. 29, 1940  3 Sheets-Sheet 1

Inventor
Willis Fay Aller
by Maréchal & Noe
Attorneys

Sept. 2, 1941.　　　　W. F. ALLER　　　　2,254,812
GAUGING APPARATUS
Filed Nov. 29, 1940　　　3 Sheets-Sheet 2
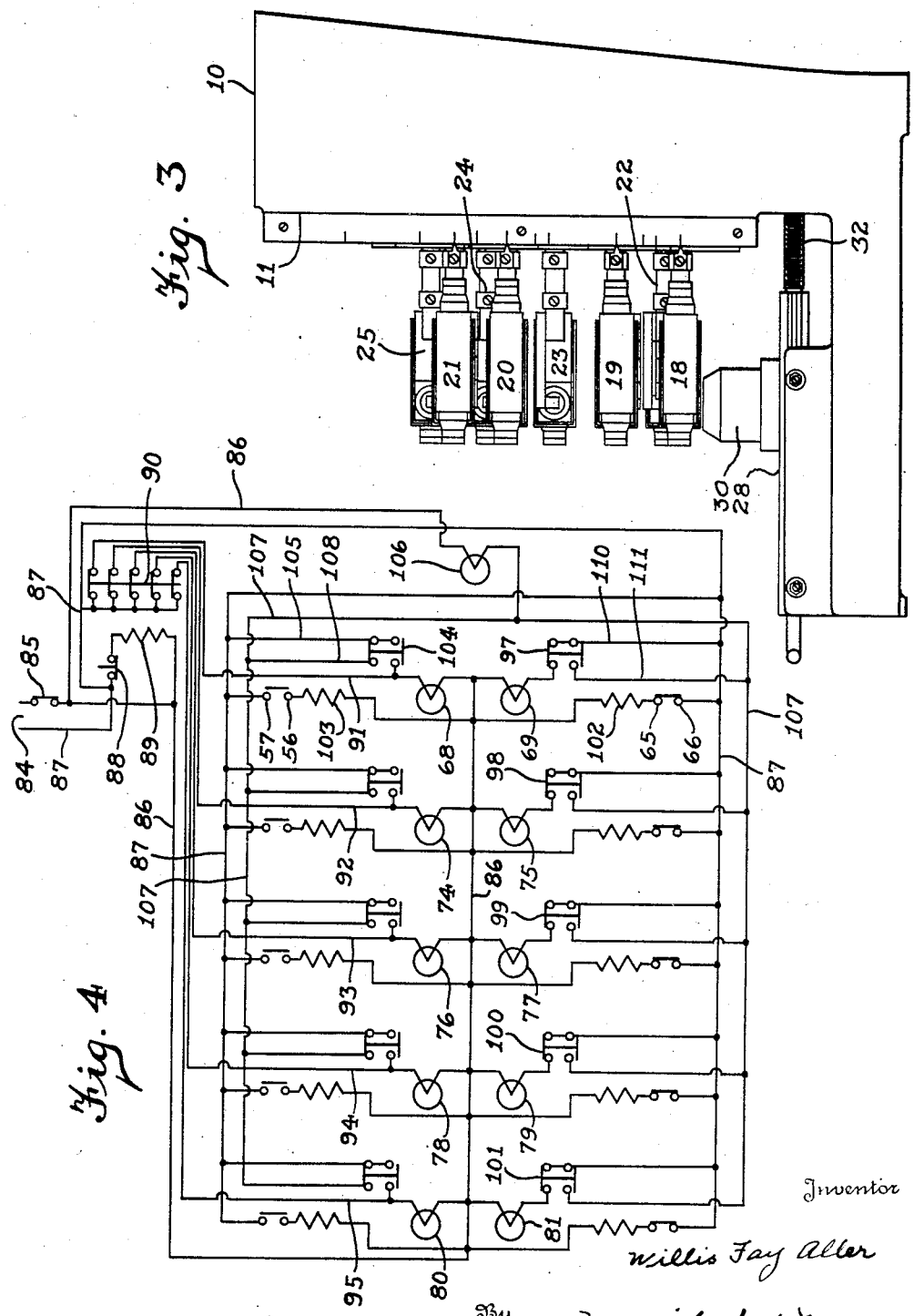

Inventor
Willis Fay Aller
by Maréchal + Noë
Attorneys

Patented Sept. 2, 1941

2,254,812

UNITED STATES PATENT OFFICE 2,254,812

GAUGING APPARATUS

Willis Fay Aller, Dayton, Ohio, assignor to The Sheffield Corporation, a corporation of Ohio Application November 29, 1940, Serial No. 367,867

11 Claims. (Cl. 33—178)

This invention relates to measuring or gauging apparatus for accurately gauging sizes of a measured part.

One object of the invention is the provision of a gauging apparatus for simultaneously gauging or comparing several dimensions of a work piece and having a series of observable means, one for each gauged portion, each of which shows whether its respective gauged portion is oversize, undersize, or of the desired predetermined size, in combination with a master indicator which automatically shows whether or not all the gauged portions conform to the predetermined sizes desired.

Another object is the provision of a gauging apparatus for simultaneously gauging or comparing several dimensions of a work piece and having pairs of signaling members that show which particular gauged portions do not conform to a desired size and whether such non-conforming portions are oversize or undersize.

Another object is the provision of a gauging apparatus of the character just mentioned, having a master lamp that shows whether or not all the dimensions checked conform to a desired size.

Another object is the provision of a gauge for checking a plurality of dimensions of a work piece and showing all oversize and undersize gauged portions, the gauge having means operated by movement of the work to a gauging position to change electrical connections in order that the signaling members will be placed in gauging condition.

Another object is the provision of a gauge for checking a plurality of dimensions of a work piece and showing all oversize and undersize gauged portions, the apparatus having a master lamp dependent for its control on all the individual oversize and undersize gauging members and embodying only a comparatively few devices that require observation by the user.

Another object is the provision of a gauge for checking a plurality of dimensions of a work piece, and embodying a number of gauge heads each having a movable work engaging element and each yieldingly supported by a series of holders which are adjustably mounted so as to be readily moved to different relative positions so that work pieces of a great variety of forms or sizes can be accommodated.

Other objects and advantages of the invention will be apparent from the following description, the appended claims and the accompanying drawings.

In the drawings, in which the same reference characters have been applied to like parts in the several views:

Fig. 3 is a side elevation of the gauging apparatus;

Fig. 4 is a diagrammatic showing of the electrical circuits and connections of the gauging apparatus;

Figure 1:
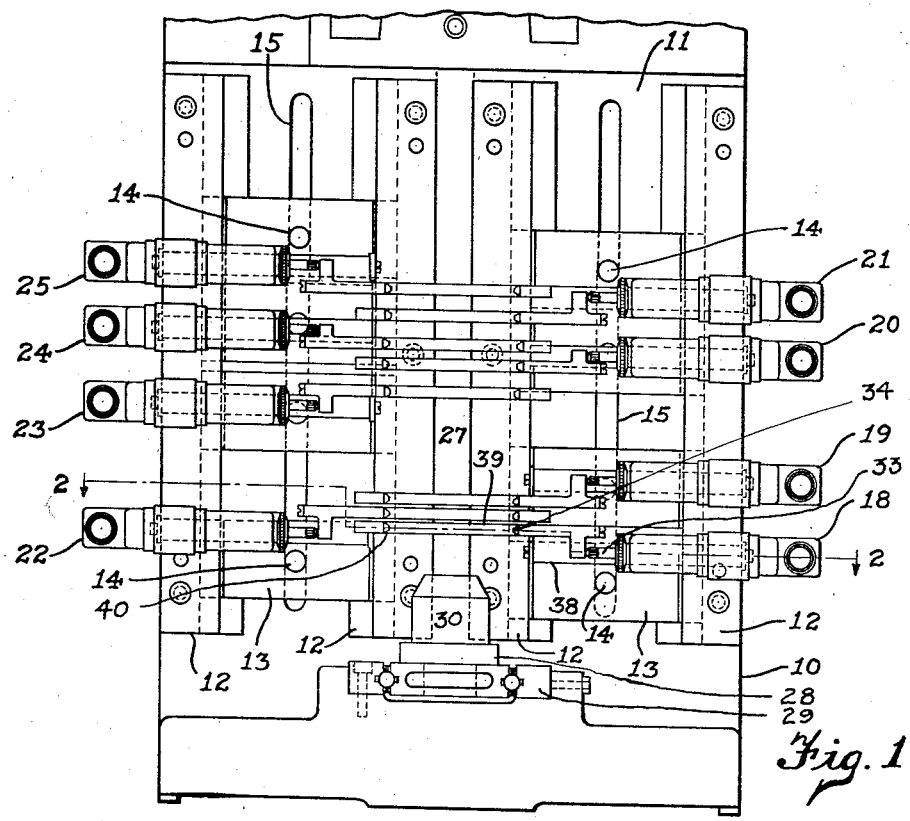
Fig. 1 is a front elevation of a gauging apparatus embodying the present invention, an upper portion being omitted in this figure.

Referring more particularly to the drawings, in which the preferred embodiment of the invention has been shown as a gauging apparatus for checking or comparing a number of diametric dimensions of an elongated work piece, the gauging apparatus comprises a suitable support 10 having an upwardly extending portion provided with a forwardly facing surface 11 to which is fixed a series of parallel guides 12, arranged in pairs, and supporting a double series of holders 13. Each holder is secured firmly against the inclined surfaces of the guides 12 by means of a clamp screw 14 threaded in the holder and extending through one or the other of a pair of slots 15 in the support 10. Fixed to each screw 14 is a hand knob 16 accessible on the rear side of the support. The several holders 13 may be moved to desired positions lengthwise of the slot 15 in accordance with the distance between a number of different points to be gauged on a work piece, and held securely in their adjusted positions by tightening the screws 14 of the respective holders.

Figure 7:
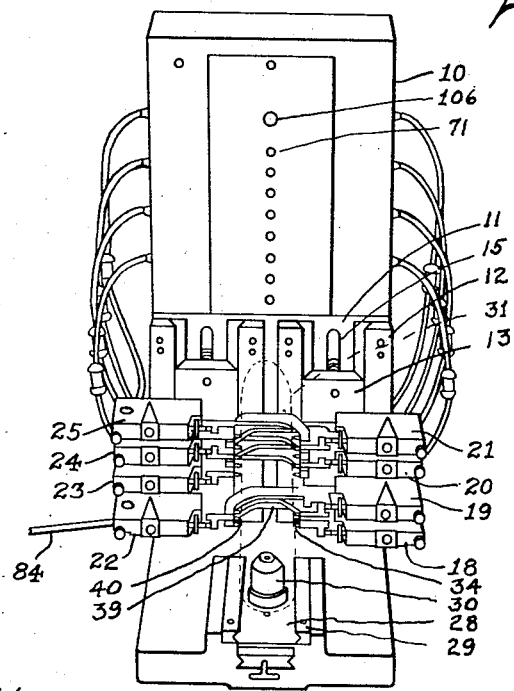
Fig. 7 is a perspective view of the apparatus, shown in a position ready to be moved to gauging position.
Figure 6:
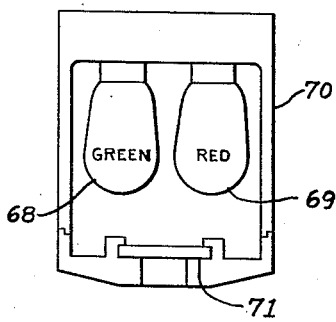
Fig. 6 is a detail view of a pair of signaling lamps.

Each holder supports a gauge head containing gauging mechanism and supporting a pair of work contacting fingers, the several gauge heads, 18 to 25 inclusive, being arranged in staggered relation with respect to one another at opposite sides of the work receiving space 27 into which a workpiece may be moved when a gauging operation is to be performed. The work may be loaded on a support slide 28 which is horizontally slidable along guideways 29. A post or arbor 30 on the slide 28 receives the lower end of the work piece 31, as shown in dotted lines in Fig. 7, and holds the work piece in a predetermined position on the slide. The work is moved to a predetermined position limited by the stop 32 engaging a portion of the slide 28, the stop 32 being shown as a screw threaded in the support 10 so as to be capable of horizontal adjusting movement.

Figure 2:
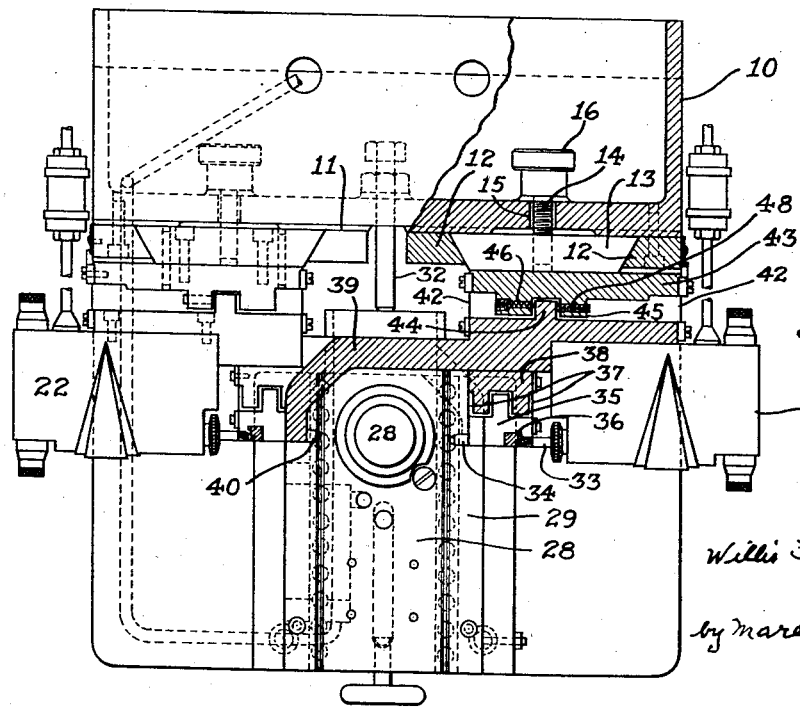
Fig. 2 is a top plan view of the gauging apparatus showing a portion in horizontal section on the line 2—2 of Fig. 1.

The gauge head 18 is provided with a gauging element 33 which is movable in a horizontal direction and relative to the housing of the gauge head, the latter containing mechanism responsive to the movements of the element 33, as will presently be described. The work is actually contacted by a finger 34 provided on a block 35 having a latterally projecting lug 36 which abuts against the end of the element 33 so that the parts 33 and 34 will move together. The block 35 is supported by means of two parallel spring blades 37, fixed by screws at one end of the same to the block 35 and fixed at their other ends to a part 38 of a head positioning arm 39 which is secured to the housing of the gauge head 18. The arm 39 extends across the work position and has a work contacting finger 40 which engages the work at a point opposite from the finger 34. The arm 39 is carried by a pair of parallel spring blades 42 which are secured by screws at one end to the arm 39 and secured at their other ends to a bar 43 which is fixed to its holder 13. A lug 44 on the arm 39 extends out, with suitable clearance at its opposite sides, in between two lugs 45 on the bar 43. A spring 46 carried in one of these lugs 45 engages against the left-hand side of the lug 44, as shown in Fig. 2, and exerts a yielding pressure towards the right against the arm 39 so that the finger 40 will be yieldingly pressed against the work. A stop screw 48 threaded in the other lug 45 limits the movement of the arm 39 towards the right to some suitable operating distance. As will be apparent, the spring blades 42 carry the arm 39 and the gauge head 18 for yielding horizontal movement, and the work, when moved into place in the gauging operation, operates against spring 46 to automatically move the gauge head and the arm 39 towards the left some little distance by pressing against the finger 40. The diameter of the work piece adjacent fingers 34 and 40 controls the movements of the finger 34 and produces an operating movement of the gauging mechanism in the holder 18.

The other gauging heads 19 to 25 inclusive are similarly arranged and constructed excepting that gauge heads 22 to 25 are reversely positioned so that their respective arms 39 extend towards the right instead of towards the left over the work location, and their respective holder positioning fingers 40 are on the right-hand side of the work and yieldingly urged toward the left, as viewed in Fig. 2.

Figure 5:
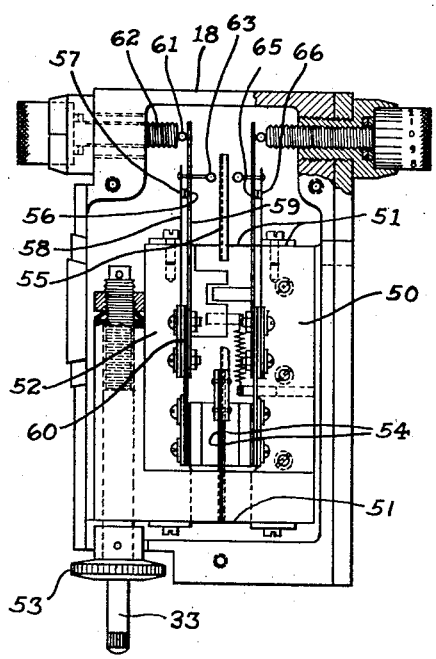
Fig. 5 is a view showing one of the gauging heads, with its side cover plate removed.

Fixed to a wall of the gauge head housing 18, as shown in Fig. 5, is a stationary block 50, connected by a pair of parallel spring blades 51 to a movable block 52 on which the work engaging element 23 is adjustably carried. Adjusting movements of this element are effected by rotating the hand knob 53 on the element to screw the same inwardly or outwardly with respect to the block 52. The two blocks are connected, at closely adjacent positions, by means of a pair of adjacent parallel spring blades 54 to an arm 55 which is shown in its centered position in Fig. 5. In this position a pair of contacts on the left-hand side of the arm, and designated 56 and 57 are held closed, contact 57 being carried by a flexible blade 58, normally biasing that contact towards the right and against contact 56, which is carried by a comparatively rigid blade 59 having a spring support 60 which normally biases the blade 59 towards the left and holds it against a stop 61 on an adjustable screw 62. The blade 58 is provided with a post 63 extending through an opening in the blade 59 and adapted to be engaged by the arm 55 when that arm moves towards the left, to thus open the contact 57 away from the contact 56. Adjustment of the position of the screw 62 permits a desired travel of the arm 55 from its centered position before opening these contacts. A similar pair of contacts 65 and 66 are similarly carried and operated, at the other side of the arm 55. The arm 55 may thus swing towards one side or the other as the movable block 52 is operated in accordance with the movements of the work engaging element 23, and selectively open one of the sets of contacts or the other in accordance with whether the work is oversize or undersize with respect to some predetermined dimension to which the gauge is previously set as by placing a work piece or standard of the required size in the gauge and adjusting the hand knob 53 until the arm 55 assumes its centered position. It will be understood that the several gauge heads are of similar construction.

Each gauge head is connected to signaling means which shows whether the work piece being gauged is undersize, oversize, or of the desired dimension. The signaling means of the several gauge heads are similar, each comprising a pair of electric lamps of different color and observable through a common viewing means which gives still another color when both lamps are energized at the same time. The pair of lamps 68, 69 of the gauge head 18 are preferably green and red respectively, and they are respectively controlled through circuits including the switch contacts 56, 57 and 65, 66. The arrangement is such that when both of these sets of contacts are closed, both the green lamp and the red lamp will be energized. These lamps are carried in a casing 70 and are viewed through an opalescent or translucent screen 71, and when both lamps are energized at the same time, as for a centered position of the contact controlling arm 55, an amber color will be apparent on the screen 71. When only one of the lamps is energized, its respective color will show through the screen 71.

The electrical connections of the various gauge heads and their respective lamps have been illustrated in Fig. 4. The lamps 68 and 69 controlled by the gauge head 18 are arranged adjacent the pairs of lamps of the other gauge heads, the viewing screens of the several pairs of lamps preferably being in line with one another. The green and red lamps 74 and 75 may be controlled by the gauge head 22, lamps 76 and 77 by the gauge head 19, lamps 78 and 79 by the gauge head 23 and lamps 80 and 81 by the gauge head 20; Fig. 4 showing the circuit arrangement in which the gauge heads 21, 24 and 25 are entirely disconnected although it will be apparent that additional pairs of lamps may be provided for those gauge heads for use when more than 5 different dimensions of the same work piece are to be gauged.

Current is supplied to the several pairs of lamps from a supply source 84, when the switch 85 is manually closed, to the service wires 86 and 87. When there is no work positioned in the gauge an automatically operable switch 88 is closed, completing a circuit through a relay coil 89 which operates a multipole switch 90 so as to close a number of circuits extending from the line side 87 through wires 91, 92, 93, 94 and 95 to the several green lamps, thus causing all the green lamps to be energized inasmuch as the other sides of those lamps are connected to the line side 86. The red lamps 69, 75, 77, 79 and 81 will also be energized as they are connected from the line side 86 to the line side 87 through their respective switches 97, 98, 99, 100 and 101. The switch 97 is controlled by a coil 102 connected in series with the switch contacts 65 and 66, which are closed, assuming the position as indicated in Fig. 5. Current thus flows through the coil 102 which holds the switch 97 in the position shown in Fig. 4, the other red lamps being similarly energized through their own respective coils and switches. It will be understood that when no work is positioned in the gauge, the switch contacts 56 and 57, which are in a circuit with the green lamp 68, will be open, since the movable spring supported block 52 is biased to project the work engaging element outwardly and thus move the arm 55 towards the left. With these contacts 56 and 57 in open circuit condition, no current flows through the coil 103 in series with those contacts, and the switch 104 which this coil controls will be in the position shown in Fig. 4, interrupting a connection, independent of the multipole switch 90, from the line side 86 through the lamp 68 and through the lead wire 105. Current however flows through the green lamp 68 through the wire 91 and through the closed switch 90, however, as previously mentioned. It will be understood that the circuits controlling the lamps 74, 76, 78 and 80 are similar to the circuit of the lamp 68, and that the circuits controlling the red lamps 75, 77, 79 and 81 are similar to the circuit of the lamp 69.

Still assuming that no work is positioned in the gauge, it will be seen that a circuit is provided through the line wire 86 to a master indicator, preferably a lamp 106 that shows red when energized, the opposite side of this lamp being connected to a wire 107 and then through any one or all of a number of parallel connections, one for each green lamp. This connection for the lamp 68 includes a wire 108, switch 104 when positioned as shown in Fig. 4, and wire 105 to the line side 87. If the switch contacts 56, 57 of any one of these green lamps are open, current can flow through the master lamp 106 and a red color will be indicated. There are also a number of parallel paths from master lamp 106 to the line side 87 through the switches 97 to 101 of the red lamps when the contacts of those switches move to the left from the position shown in Fig. 4, as by opening the contacts 65, 66. These parallel paths extend through the wires 110 and 111.

When the work piece is applied to the gauge, the slide carrying the work piece, as it moves into gauging position, automatically opens the switch 88, which is arranged in the lower portion of the support 10, against a suitable tensioning spring. This de-energizes coil 89 and thus opens the multipole switch 90 so that all of the green lamps will not necessarily show a green color, the green lamps being automatically placed under the direct control of their respective switches 104 which are controlled in turn by their respective contacts 56, 57. The gauges are thus placed in gauging condition. Now if all of the parts gauged conform to the predetermined sizes for which the various gauges have been set, the various red lamps 69, 75, 77, 79 and 81 will remain energized since their respective contacts 65, 66 will remain closed. The green lamps will remain energized because now their respective contacts 56, 57 are closed, energizing their relays 103 and thus moving the several double pole switches 104 towards the left so as to complete a circuit through each green lamp from the line side 86 through wires 105 to the side 87 of the line. Thus the various pairs of red and green lamps, viewed through their respective screens will show an amber color on these screens. Under these conditions, also, the master lamp 106 will be de-energized since there is no return path to the line side 87, all of the various parallel paths, one for each of the gauging lamps, being open circuited by their respective switches 104 for the green lamps and 97 to 101 for the red lamps. The operator, noting that the lamp 106 is de-energized, will know at a glance, not only that a work piece is being gauged, but also that every gauged dimension conforms to a predetermined size standard for which its particular gauge head has been set.

If any one of the gauged portions is either oversize or undersize, the master lamp 106 will be energized, as a circuit will be completed through that lamp from the line side 86 through the wires 105, 108 and switch 104 which completes a circuit through those wires if the contacts 56, 57 are open, or if any of the contacts 65, 66 of the red lamps are open, corresponding to an oversize condition of its respective gauge element, a circuit will be completed through the lamp 106 through the wires 110 and 111 of any of the red lamps. When the operator sees that the lamp 106 is energized, he will immediately know that at least one of the gauged sizes does not conform to a predetermined dimension, and he can then look down the row of the opalescent screens or signaling means and see which particular dimension or dimensions do not conform to a desired size, and note by the color given by the screen or screens, whether the dimensions that do not conform to a desired size are oversize or undersize. He has a comparatively few signaling devices to watch to determine all of these factors. Thus, assuming that the gauge head containing the lamps 78 and 79 measure an oversize condition and the gauge head containing lamps 68 and 69 of gauge head 18 measure an undersize condition of the work piece, the other dimensions conforming to their respective desired sizes. Under these conditions the master lamp 106 will be energized. The lamps 74, 75, 76, 77, 80 and 81, all being energized, will present an amber color in the several screens, while the lamp 79 will be de-energized, the green color of the lamp 78 showing through the opalescent screen. The green lamp 68 of gauge head 18 will be de-energized, the red color of the lamp 69 showing through its respective screen.

As will now be quite apparent, the operator can determine every gauged size that does not conform to a desired measurement, and can determine whether or not those particular gauged portions that do not conform to a desired size, are oversize or undersize. In determining all of these factors, the operator only needs to view one more signaling means than the total number of sizes that are being compared or checked, and by viewing the master light he can determine immediately if the part being checked conforms completely, in its gauged portions, to the desired sizes of those various portions. If any lamp burns out during use, that fact will be promptly detected, since all the signaling means should show an amber color before applying the work to gauging position and since a change or operation of the master lamp should take place if all the gauged portions of the work piece are of desired size.

While the form of apparatus herein described constitutes a preferred embodiment of the invention, it is to be understood that the invention is not limited to this precise form of apparatus, and that changes may be made therein without departing from the scope of the invention which is defined in the appended claims.

What is claimed is:

1. In a gauge for simultaneously gauging a plurality of portions of the same work piece, a series of work contacting elements, an operated member movable by each of said elements, a pair of switches for each operated member each adapted for alternate operation as the operated member moves to one side or the other from its normal position, means for holding the various elements, members and switches in operative relationship, signaling means for each pair of switches, circuits for said switches for operating the signaling means to show whether the respective gauged portions are undersize, oversize or of a desired size, and an indicating device common to all of said signaling means and having multiple circuit connections controlled by the circuits of all said signaling means to indicate whether or not all the gauged portions conform to a predetermined size.

2. In a gauge for simultaneously gauging a plurality of portions of the same work piece, a series of work contacting elements, an operated member movable by each of said elements, a pair of switches for each operated member each adapted for alternate operation as the operated member moves to one side or the other from its normal position, means for holding the various elements, members and switches in operative relationship, a signaling device for each switch, a circuit connected to each switch for operating each signaling device when its switch is operated to show which particular dimensions depart from a standard dimension, an indicating device common to all of said signaling devices, and means for operating said indicating device only when all said signaling devices are operated to show when all dimensions checked correspond to predetermined size standards.

3. In a gauge for simultaneously gauging a plurality of portions of the same work piece, a series of work contacting elements, a movable arm for each element, a switch at each side of each arm and operated thereby, said switches being normally closed when the arms are positioned by work of a desired size, means for holding the various elements, arms and switches in operative relationship, a signaling member for each switch, a circuit for energizing each signaling member when its respective switch is closed, and an indicating device common to all said circuits and indicating when all of said switches are closed and all of said signaling devices are energized.

4. In a gauge for simultaneously gauging a plurality of portions of the same work piece, a series of work contacting elements, a movable arm for each element, a switch at each side of each arm and operated thereby, said switches being normally closed when the arm is positioned by work of a desired size, means for holding the various elements, arms and switches in operative relationship, a lamp for each switch, means including a relay for energizing each lamp when its respective switch is closed, said several energizing means including a number of parallel connection circuits, a master device common to all of said lamps, a circuit for said master lamp extending through all of said parallel connection circuits for operation of the master device only when all of said parallel connection circuits are broken to indicate that all sizes checked conform to a predetermined size standard.

5. In a gauge for simultaneously gauging a plurality of portions of the same work piece, a series of work contacting elements, a movable arm for each element, pairs of switches one at each side of each arm for alternate operation thereby, said switches being normally closed when the arms are positioned by work of a desired size, means for holding the various elements, arms and switches in operative relationship, a lamp for each switch, means for energizing each lamp when its respective switch is closed, said lamps being arranged in pairs, one pair for each pair of switches and of different color in each pair, a translucent screen in front of each pair of lamps and presenting a color different from either of the individual lamps of a pair when both lamps are energized, a master lamp, and a circuit having portions common to all the individual lamp circuits for controlling said master lamp.

6. In a gauge for simultaneously gauging a plurality of portions of the same work piece, holding means, a series of gauge heads mounted for independent movement on said holding means in a direction parallel to its gauged dimension, a work finger on each gauge head to position its head with respect to the holding means, a movable gauging element operably mounted on each gauge head, switch means operated by each gauging element, pairs of lamps and circuits controlled by said switch means to show which particular gauged portions do not conform to a predetermined size and whether such gauged portions are oversize or undersize, and means operated by movement of the work to gauging position to control the circuits of the lamps to place the same in gauging condition.

7. In a gauge for simultaneously gauging a plurality of portions of the same work piece, holding means, a series of gauge heads mounted for independent movement on said holding means in a direction parallel to its gauged dimension, a work finger on each gauge head to position its head with respect to the holding means, a movable gauging element operably mounted on each gauge head, switch means operated by each gauging element, pairs of lamps and circuits controlled by said switch means to show which particular gauged portions do not conform to a predetermined size and whether such gauged portions are oversize or undersize, means including an automatically operable switch providing for normal energization of the undersize indicating lamps when no work is positioned for gauging, and means operated by movement of the work to gauging position to control said switch and place the circuits of the undersize indicating lamps in gauging condition.

8. In a gauge for simultaneously gauging a plurality of portions of the same work piece, a support, a series of holders on said support, a gauge head yieldingly mounted on each holder for movement parallel to its gauged dimension, a work finger on each gauge head to position its head with respect to its holder, a movable gauging element operably mounted on each gauge head, a pair of switches operated by each gauging element, signaling members and circuits controlled by said switches to show which particular gauged portions do not conform to a predetermined size and whether such gauged portions are oversize or undersize, and a master device common to said signaling members for showing when all the dimensions they check conform to desired sizes.

9. In a gauge for simultaneously gauging a plurality of portions of the same work piece, a support, a series of holders on said support, a gauge head yieldingly mounted on each holder for movement parallel to its gauged dimension, a work finger on each gauge head to position its head with respect to its holder, a movable gauging element operably mounted on each gauge head, a pair of switches operated by each element, signaling members and circuits controlled by said switches to show which particular gauged portions do not conform to a predetermined size and whether such gauged portions are oversize or undersize, a work carrier operably mounted for movement between a gauging position and a loading position, means for normally providing a normal indication of said signaling members corresponding to a work piece of predetermined dimensions when no work is being gauged and means operated by said work carrier upon movement to a gauging position to place the circuits controlled by said switch means in gauging condition.

10. In a gauge for simultaneously gauging a plurality of portions of the same work piece, a support, a series of holders on said support, a gauged head yieldingly mounted on each holder for movement parallel to its gauged dimension, a work finger on each gauge head to position its head with respect to its holder, a movable gauging element operably mounted on each gauge head, a pair of switches operated by each element, signaling members and circuits controlled by said switches to show which particular gauged portions do not conform to a predetermined size and whether such gauged portions are oversize or undersize, and means operated by movement of work to gauging position to place the circuits controlled by said switch means in gauging condition.

11. In a gauge for simultaneously gauging a plurality of portions of the same work piece, a support, a series of holders adjustably mounted on said support, a gauge head yieldingly mounted on each holder for movement parallel to its gauged dimension, a work finger on each gauge head to position its head with respect to the holder, a movable gauging element operably mounted on each gauge head, switch means operated by each element, pairs of lamps and circuits controlled by said switch means to show which particular gauged portions do not conform to a predetermined size and whether such gauged portions are oversize or undersize, a work carrier operably mounted for movement between a gauging position and a loading position, means for normally providing a normal indication of said pairs of lamps corresponding to a work piece of predetermined dimensions when no work is being gauged, and means operated by said work carrier upon movement to gauging position to place the circuits controlled by said switch means in gauging condition.

WILLIS FAY ALLER.